United States Patent

[11] 3,624,542

[72] Inventor Alexander L. Pugh, Jr.
  Paoli, Pa.
[21] Appl. No. 748,011
[22] Filed July 26, 1968
[45] Patented Nov. 30, 1971
[73] Assignee TRW Inc.
  Philadelphia, Pa.

[54] CONTROL FOR POWER OUTPUT OF GAS LASER
  2 Claims, 6 Drawing Figs.
[52] U.S. Cl. .................................................. 331/94.5,
  350/172
[51] Int. Cl. .................................................. H01s 3/11,
  H01s 3/22, G02b 27/14
[50] Field of Search .......................................... 331/94.5;
  350/271, 272

[56] References Cited
  UNITED STATES PATENTS
3,395,367 7/1968 Bell et al. .................... 331/94.5
3,463,575 8/1969 Gates, Jr. .................... 350/172

OTHER REFERENCES
Stamper, " Differential Sensing Controlled Thermocouple," Rev. Sci. Instr. 34, (4), April, 1963, pp. 444– 445.
Weiner et al., " Thermopile IR Detectors" Space/Aeronautics, Vol. 40, Aug. 1963, pp. 95– 100.
TRG, " Thermopiles Measure Millijoules, Gigawatts" Electronics, Vol. 38, Sept. 6, 1965, pp. 148, 150.

Primary Examiner—Ronald L. Wibert
Assistant Examiner—Robert J. Webster
Attorneys—Donald C. Keareney, ALfred B. Levine and Paris, Haskill and Levine ABSTRACT: A control for maintaining uniform the luminous power output of a laser comprising a beam splitter, a temperature sensitive device and a device to vary the power input to the laser. The beam splitter diverts a portion of the output beam of the laser and directs the diverted portion of the beam onto the temperature sensitive device. The temperature sensitive device provides an electrical output which will vary to correspond with any variation in the output of the laser. The temperature sensitive device is electrically connected to the electrical input to the laser so that any variation in the output of the laser will vary the electrical input to the laser and thereby maintain the output of the laser substantially uniform.

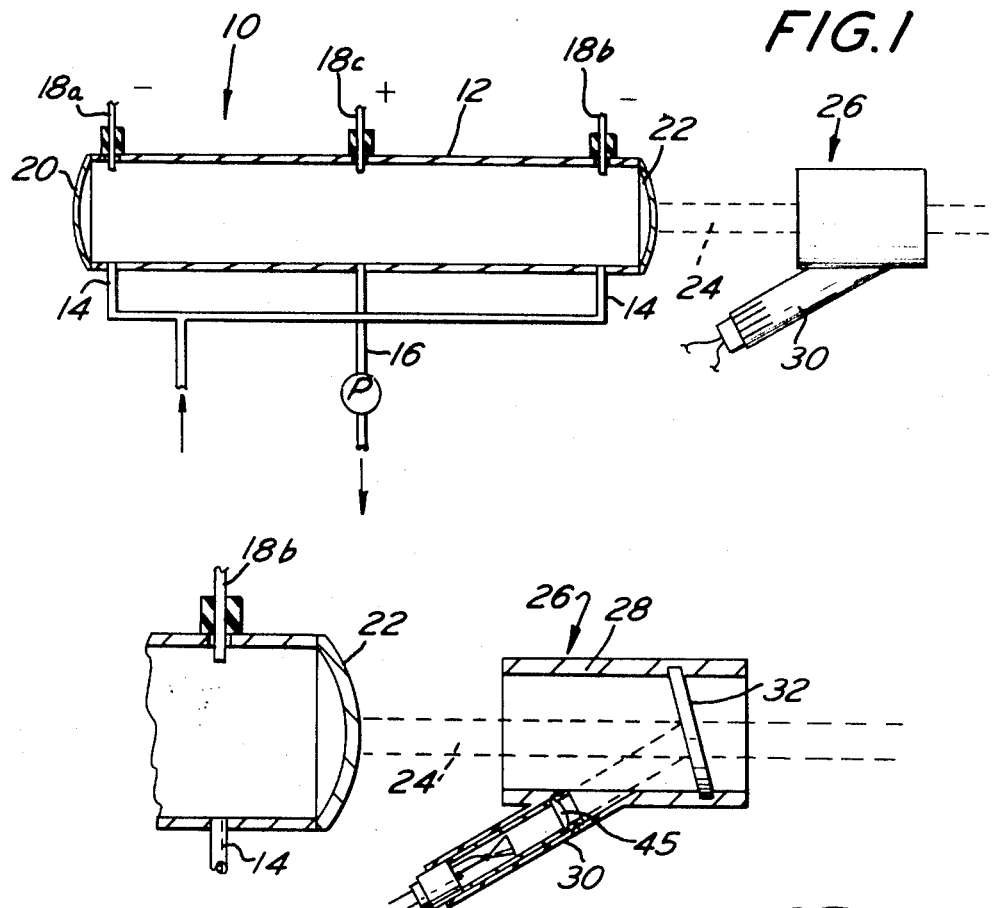
FIG. 1
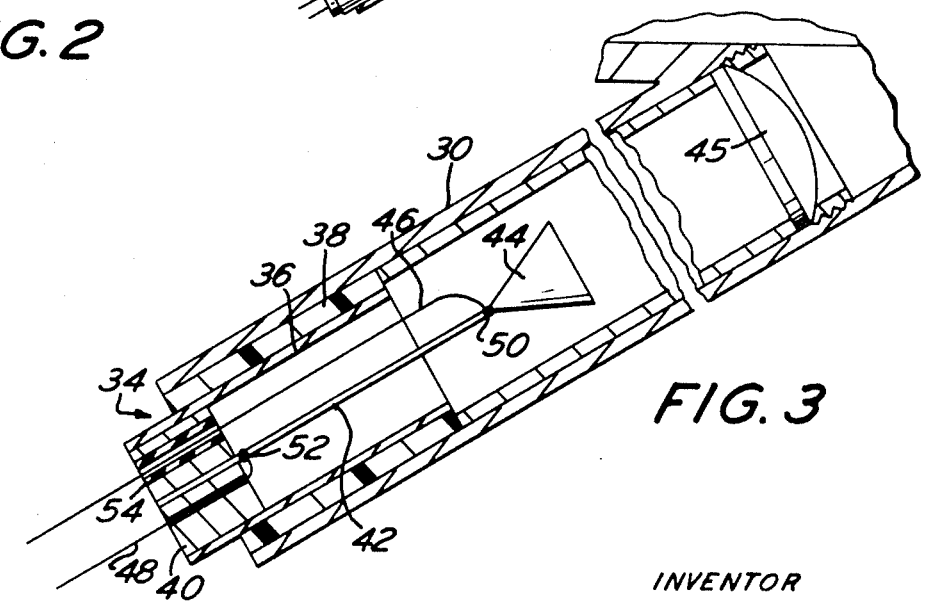
FIG. 2
FIG. 3
INVENTOR
ALEXANDER L. PUGH, JR.
BY
*Donald S. Cha*
ATTORNEY

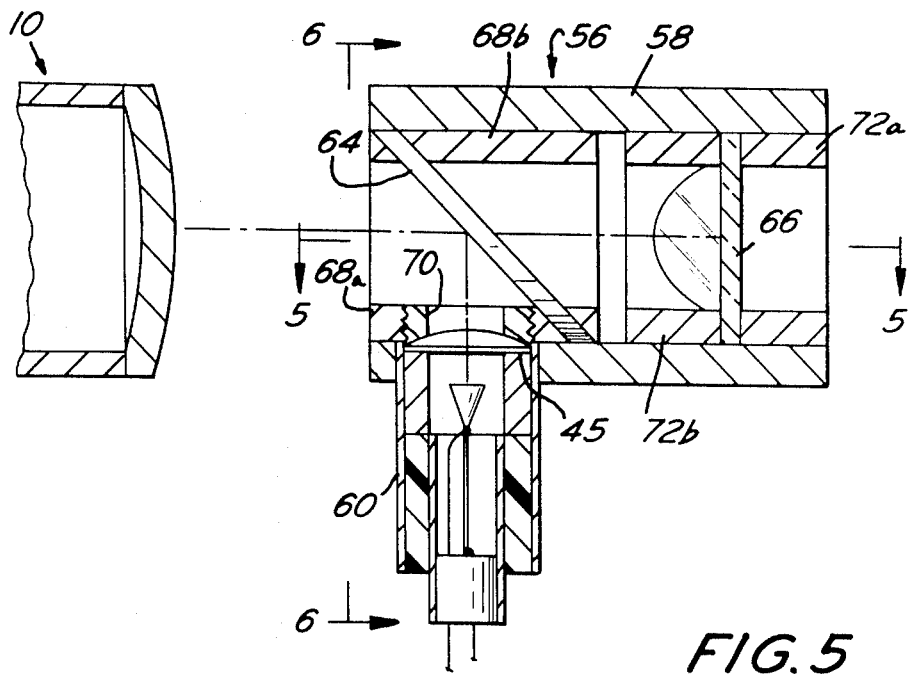
FIG. 4
FIG. 5
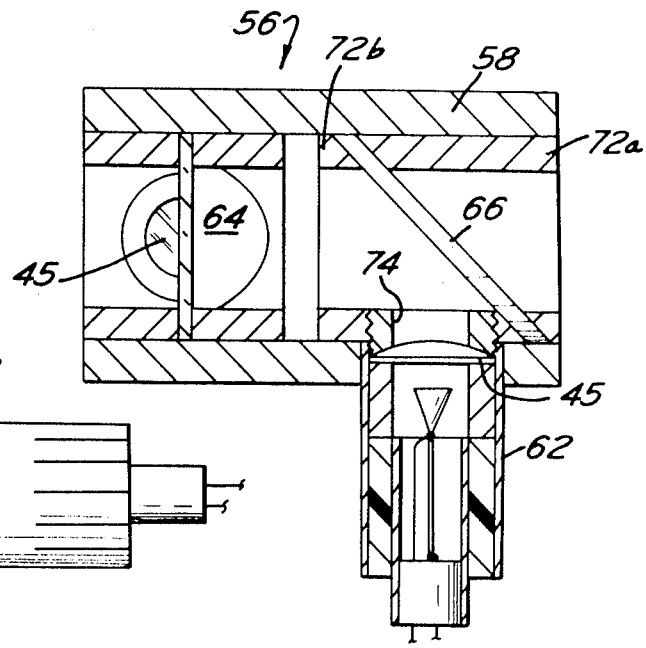
FIG. 6
INVENTOR
ALEXANDER L. PUGH, JR.
ATTORNEY

CONTROL FOR POWER OUTPUT OF GAS LASER

BACKGROUND

It has been found that the intensity of the luminous power output of a continuous output laser, particularly a gas laser, varies spontaneously with time even when the electrical input to the laser is maintained constant. For many uses of the laser it is highly desirable to maintain the output of the laser substantially uniform. Since no reason could be found for all the variations in the output, it was found necessary to obtain a substantially uniform output by varying the input to compensate for the variations in the output. For this purpose, it was found necessary to continuously monitor the output of the laser for the variations and, when the variations occurred, vary the input to the laser accordingly to compensate for the output variations. However, difficulties arose in continuously monitoring the output of the laser in a manner which would not interfere with the working portion of the output beam but which would quickly discern and measure the variations in the working portion of the output in order to permit compensation for these variations.

SUMMARY OF INVENTION

It is an object of the present invention to provide a control for maintaining the output of a laser substantially uniform.

It is another object of the present invention to provide a control for a laser which varies the electrical input to the laser to compensate for variations in the output of the laser so as to maintain a substantially uniform output.

It is still another object of the present invention to provide a control for a laser which continuously monitors the output beam of the laser for variations in the output and compensation for such variations by varying the electrical input to the laser.

It is a further object of the present invention to provide a control for maintaining the output of a laser substantially uniform which diverts a portion of the output beam so that any variations in the diverted portion of the output beam substantially correspond to variations in the remaining portion of the output beam, continuously monitors the diverted portion of the beam and compensates for variations in the output beam by varying the electrical input to the laser.

Other objects will appear hereinafter.

BRIEF DESCRIPTION OF DRAWING

For the purpose of illustrating the invention, there is shown in the drawings forms which are presently preferred; it being understood, however, that this invention is not limited to the precise arrangements and instrumentalities shown.

FIG. 1 is a schematic view of a flowing gas laser having the control device of the present invention.

FIG. 2 is a longitudinal sectional view of the control device of the present invention showing its relation to the laser.

FIG. 3 is an enlarged longitudinal sectional view of a portion of the control device shown in FIG. 2.

FIG. 4 is a longitudinal sectional view of a modification of the control device of the present invention and showing its relation to the laser.

FIG. 5 is a sectional view taken along line 5—5 of FIG. 4.

FIG. 6 is an end plan view taken along line 6—6 of FIG. 4.

DESCRIPTION OF INVENTION

Referring initially to FIG. 1, there is shown a gas laser, generally designated as 10. Laser 10 may be of any well-known construction for a gas laser and the details of construction of laser 10 form no part of the present invention. However, as shown, laser 10, in general, comprises an elongated cylindrical tube 12 having gas inlet pipes 14 adjacent its ends and a gas outlet pipe 16 midway between its ends. This provides for a flow of the operating gas from the ends of the tube 12 to the center of the tube. Three electrodes 18a, 18b and 18c extend through the tube 12 with the electrodes 18a and 18b being located adjacent the ends of the tube and the electrode 18c being located midway between the ends of the tube. The electrodes are connected to a source of DC electrical current so that the end electrodes 18a and 18b are of the same polarity and the center electrode 18c is of the opposite polarity. As shown, the end electrodes 18a and 18b are the negative electrodes and the center electrode 18c is the positive electrode. A pair of reflectors 20 and 22 are mounted across the ends of the tube 12. The reflector 20 at the back end of the tube 12 is a complete reflector having no transmission, whereas the reflector 22 at the front end of the tube 12 is constructed to allow for partial transmission.

In the operation of the laser 10, the source of current to the electrodes is turned on to provide a potential between the center electrode 18c and the end electrodes 18a and 18b. This potential causes the gases, usually at less than atmospheric pressure, flowing through the tube 12 to glow creating a beam of light, formed by the so-called lasing action, which is reflected back and forth between the reflectors 20 and 22. However, some of this beam is transmitted through the front reflector 22 to provide the output beam of the laser as indicated by the dash lines 24.

To continuously monitor the output beam of the laser 10 for variations in the intensity of the output beam so as to permit the varying of the input current to the laser and thereby compensate for such variations, the control device of the present invention, generally designated as 26, is positioned in the path of the output beam. As shown in FIG. 2, the control device 26 comprises a cylindrical housing 28 having a tubular arm 30 extending at an angle from the housing 28. The control device 26 is positioned so that the output beam of the laser 10 passes through the housing 28. A beam splitter plate 32 is mounted within and extends across the housing 28. The beam splitter plate 32 is of any well-known material, such as zinc solenide, zinc sulfide, germanium or quartz, which transmits most of the output beam of the laser but reflects a portion of the beam. The beam splitter plate 32 is positioned at an angle of between 10 and 25, and preferably at an angle of 15. The angle of inclination of the beam splitter plate 32 is the angle between the longitudinal axis of the output beam of the laser and a line perpendicular to beam splitter plate. The arm 30 is positioned at an angle so that the reflected portion of the beam passes longitudinally through the arm.

It has been found that the angle of the beam splitter plate 32 is critical in order to obtain a reflected beam which can be satisfactorily used for accurately controlling the output beam of the laser 10. If the angle of the beam splitter plate 32 is greater than 25°, it has been found that the variations in the intensity of the reflected beam do not correlate sufficiently to the variations in the transmitted portions of the beam as to achieve an accurate compensation for the variations in the output beam by means of measuring the variations of the reflected beam. This is believed to be caused by the variation in the polarization of the beam and a polarizing effect of the material of the beam splitter plate. However, if the angle of the beam splitter plate 32 is not greater than 25°, the variations in the reflected beam are sufficiently correlated to the variations in the transmitted beam to permit the reflected beam to be used to control the laser for compensating the variations. It has been also found that if the angle of the beam splitter plate 32 is less than 10°, at least a portion of the reflected beam overlaps the output beam from the laser 10 so that it is difficult to accurately measure the intensity of the reflected beam. Thus, by having the beam splitter plate 32 at an angle of between 10° and 25°, the intensity of the reflected beam can be easily and accurately measured and any variations in the intensity of the reflected beam will correlate to the variations in the transmitted beam so as to permit compensation for such variations. An angle of 15° is preferred since it optimizes the ability to measure the reflected beam and the correlation between the variations in the reflected beam with regard to the transmittal beam.

Mounted in the end of the arm 30 is a temperature measuring device, generally designated as 34, for measuring the temperature of the reflected beam. As shown in FIG. 3, the temperature measuring device 34 comprises a metal mounting sleeve 36 secured in the end of the arm 30 with a sleeve 38 of an electrical insulation material secured between the mounting sleeve and the arm. The mounting sleeve 36 projects beyond the end of the arm 30 so as to expose the mounting sleeve to the atmosphere and permit cooling of the mounting cleeve. A metal plug 40 is secured within the outer end of the mounting sleeve 36. A relatively heavy, stiff wire 42 of a good heat conductive metal with a high Seebeck coefficient is secured in the plug 40. The wire 42 extends longitudinally through the mounting sleeve 36 and projects beyond the inner end of the mounting sleeve into the arm 30. A metal collector cone 44 is mounted on the end of the wire 42 with the apex of the cone being secured to the wire. The open end of the cone 44 faces the beam splitter plate 32. A lens 45, mounted in the inner end of the arm 30, directs the reflected beam into the cone 44. Thus, the cone 44 conducts the heat of the reflected beam to the end of the wire 42. A wire 46 is connected to the wire 42 adjacent the cone 44, and a second wire 48 is connected to the wire 42 adjacent the plug 40. The wires 46 and 48 are of a metal dissimilar from the metal of the wire 42 and are of a metal which provides thermocouple junctions 50 and 52 at their connections with the wire 42. For example, if the wire 42 is of iron, the wires 46 and 48 can be constantan. However, the wires 42, 46 and 48 can be of any other well-known metals which will form thermocouple junctions. The wire 46 extends from the mounting sleeve 36 through a bushing 54 of an electrical insulation material, and the wire 48 extends from the sleeve 36 through an opening in the plug 40. The wires 46 and 48 are connected to the source of current for the laser 10 through any well-known temperature indicator and current controller, such as a standard industrial potentiometer-type indicator and controller.

In the use of the control device 26 of the present invention, the output beam of the laser 10 passes through the housing 28 where a portion of the beam is reflected by the beam splitter plate 32. The reflected beam is directed into the cone 44 which converts the light of the reflected beam into heat and raises the temperature of the wire 42. The thermocouple 50 provides an electrical output corresponding to the temperature of the wire 42 at the cone 44 and the thermocouple 52 provides an electrical output corresponding to the temperature of the wire 42 at the plug 40. Since the thermocouple 52 is spaced from the thermocouple 50, the temperature of the wire 42 at the thermocouple 52 is less than the temperature of the wire 42 at the thermocouple 50. Thus, the reading between the two wires 46 and 48 is a reading of the differences between the two temperatures. The heat in the wire 42 is conducted to the outer end of the sleeve 36 through the plug 40 where it is dissipated into the atmosphere.

The voltage across the two wires 46 and 48 is read by the temperature indicator and controller which in turn controls the current from the source for the laser 10. Thus, any changes in the voltage across the wires 46 and 48 caused by a variation in the intensity of the output beam of the laser, results in a variation in the current input to the laser 10 to compensate for such variation. If the intensity of the output beam of the laser decreases, the input to the laser is correspondingly increased, and if the intensity of the output beam increases, the input to the laser is correspondingly decreased. Thus, the control 26 of the present invention continuously monitors and measures the intensity of the output beam of the laser so that any variations in the intensity of the output beam can be used to vary the electrical input to the laser in a compensating manner. Thus, the working beam transmitted from the control device 26 is maintained at a uniform intensity.

Since the intensity of the output beam of the laser 10 can be varied by varying the pressure of the gas flowing through the laser as well as by varying the electrical input to the laser, the electrical output from the control device 26 may be used to vary the pressure of the gas instead of varying the electrical input to the laser to maintain the output uniform. For example, the controller to which the temperature measuring device 34 is connected may be connected to either a control valve in the gas flow line or the pump for the gas so as to vary the pressure of the gas in a manner to compensate for the variations in the intensity of the output beam.

Referring to FIGS. 4–6, there is shown a modification of the control device of the present invention which is generally designated as 56. Control device 56 comprises a cylindrical housing 58 having a pair of tubular arms 60 and 62 extending therefrom at right angles to the longitudinal axis of the housing. The arms 60 and 62 are positioned adjacent opposite ends of the housing 58 and are circumferentially spaced apart 90° around the housing. A pair of beam splitter plates 64 and 66 are mounted in the housing 58 with each of the plates being adjacent a separate one of the arms. Each of the beam splitter plates 64 and 66 is positioned at a 45° angle so as to direct a reflected portion of the output beam of the laser 10 into the adjacent arm. Thus, the beam splitter plates 64 and 66 are turned 90° with respect to each other. The beam splitter plate 64 is secured in position in the housing 58 by two split rings 68a and 68b. The split rings 68a and 68b fit tightly within the housing 58 and clamp the edge of the beam splitter plate 64 therebetween, the split ring 68a has an opening 70 therethrough in alignment with the arm 60. Likewise, the beam splitter plate 66 is secured in position by a pair of split rings 72a and 72b which fit tightly within the housing and clamp the edge of the beam splitter plate 66 therebetween. The split ring 72b has an opening therethrough in alignment with the arm 62. Separate temperature measuring devices 34, identical in construction to the temperature measuring device shown in FIG. 3, are mounted in the outer ends of each of the arms 60 and 62. The outputs of the two-temperature sensing devices 34 are electrically connected in series to a temperature indicator and controller which, in turn, is connected to the source of current for the laser 10.

In the use of the control device 56 of the present invention, the output beam of the laser 10 passes through the housing 58. The beam splitter plate 64 reflects a portion of the output beam through a lens 45 onto the temperature measuring device 34 in the arm 60. The beam splitter plate 66 reflects through a lens 45 onto the temperature measuring device 34 in the arm 62 a portion of the beam transmitted by the beam splitter plate 64. Each of the temperature measuring devices 34 provides an electrical output corresponding to the intensity of the reflected beam directed at the respective temperature measuring device. The combined outputs of the temperature measuring devices 34 are measured by the temperature indicator. Any variations in the combined outputs of the temperature measuring devices caused by a variation in the intensity of the output beam of the laser 10 results in the controller varying the electrical input to the laser to compensate for the variation in the intensity of the output beam in the manner previously described. Since the angle of each of the beam splitter plates 64 and 66 is greater than 25°, a variation in the portion of the beam reflected by each of the beam splitter plates does not correlate sufficiently with the variation in the transmitted portion of the beam to permit either of the reflected beams to be used individually for controlling the uniformity of the transmitted beam. However, it has been found that the combined variations in the reflected beams does correlate sufficiently to permit the combined outputs of the temperature sensing devices to be used to control the uniformity of the transmitted beam.

The present invention may be embodied in other specific forms without departing from the spirit or essential attributes thereof, and, accordingly, reference should be made to the appended claims, rather than to the foregoing specification as indicating the scope of the invention.

I claim:

1. In a control for maintaining uniform the luminous output of a laser comprising means for diverting a portion of the output beam from the laser with the diverted portion of the beam having a variation in intensity corresponding to any variation in the intensity of the output beam of the laser, means for detecting the temperature of the diverted portion of the beam, means for providing an electrical output corresponding to the detected temperature of the diverted portion of the beam, said means for diverting a portion of the output beam of the laser being a beam splitter means, and said beam splitter means comprising a beam splitter plate extending across the path of the output beam of the laser and positioned at an angle of inclination of between 10° and 25°, said angle of inclination being the angle between the longitudinal axis of the output beam and a line perpendicular to the beam splitter plate.

2. A control in accordance with claim 11 in which the angle of inclination of the beam splitter plate is 15°.

* * * * *